United States Patent [19]

Song

[11] 4,414,497
[45] Nov. 8, 1983

[54] DIGITALLY CONTROLLABLE ELECTRONIC DAMPER

[75] Inventor: Hubert Song, Sunnyvale, Calif.

[73] Assignee: Verbatim Corporation, Sunnyvale, Calif.

[21] Appl. No.: 227,180

[22] Filed: Jan. 22, 1981

[51] Int. Cl.³ .............................................. G05B 19/40
[52] U.S. Cl. ..................................... 318/696; 318/685
[58] Field of Search ................................ 318/696, 685

[56] References Cited

U.S. PATENT DOCUMENTS 4,215,302  7/1980  Chiang ................................. 318/696
4,258,622  3/1981  Estrabaud .......................... 101/93.01

Primary Examiner—J. V. Truhe
Assistant Examiner—Saul M. Bergmann
Attorney, Agent, or Firm—Thomas E. Schatzel

[57] ABSTRACT

A circuit for electronic damping of stepper motors capable of generating a pulse train for a wide range of steps such that the pulse train is contained within a period or periods of the resonant frequency of the rotor of the stepper motor to pre-condition for the delayed last step and the last pulse is delayed by a half-period of the resonant frequency. A frequency synthesizer generates a clock signal having a frequency which is an integer multiple of the natural frequency of the rotor of the stepper motor. The clock signal is fed through a gate to a digitally controllable counter which generates an output after one full period of the stepper motor rotor's natural frequency. The output of the digitally controllable counter closes the gate to block the clock signal and triggers a delay circuit which generates the last pulse after a half-period of the natural frequency of the rotor of the stepper motor.

6 Claims, 2 Drawing Figures

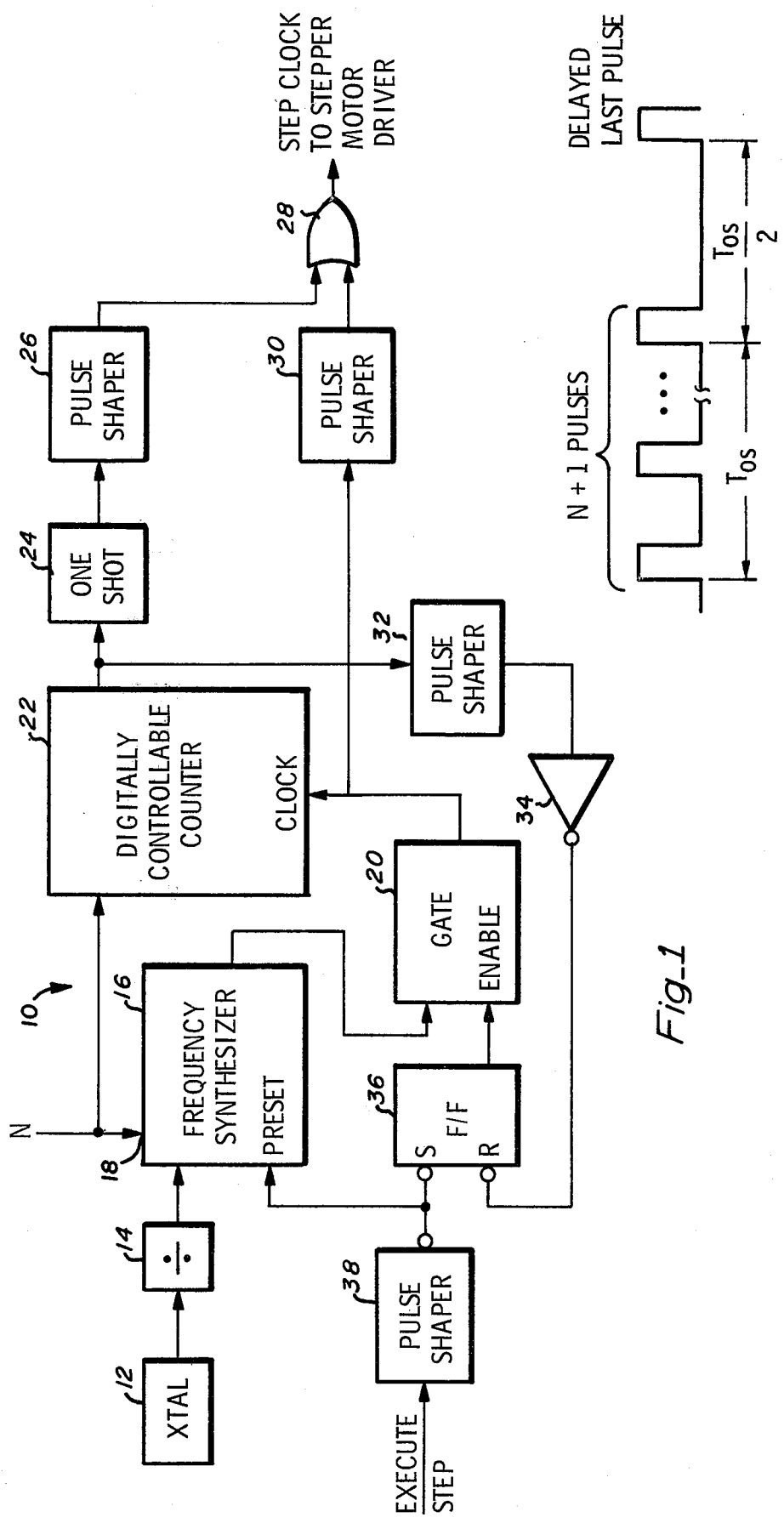

DIGITALLY CONTROLLABLE ELECTRONIC DAMPER

BACKGROUND OF THE INVENTION

1. Field of the Invention

The invention relates generally to stepper motors and more particularly to a digitally controllable electronic damper for providing pulses to a stepper motor whereby oscillations of the rotor of the stepper motor are damped.

2. Description of the Prior Art

Stepper motors are widely used for discrete positioning control and there are numerous applications for discrete positioning. A common application for stepper motors is the positioning of a part or work piece in which holes are to be drilled. The part is clamped to a table which is movable in an X and/or Y orthogonal direction. One stepper motor controls the movement of the table in the X direction and another stepper motor controls the movement of the table in the Y direction. A computer may be programed to provide control signals to control movement of the table, via the stepper motors, to a predetermined position and then drill a hole in the part. Control signals may then be generated and control movement of the table to another position where another hole is drilled. This procedure may be continued for as many holes as are necessary to be drilled in the part.

At the end of a stepping operation, the rotor of a stepper motor will oscillate for a period of time before coming to rest. This can become critical where positioning must be done at high speeds. For example, in high speed printers stepper motors are used to rotate rotor platen which feeds the paper through the printer. If the oscillations were to occur while the printer was typing a line, the print would come out uneven. Thus, it is desirable to dampen the oscillations before beginning to print. However, the time to accomplish such damping consumes time and the overall speed of the printer is decreased.

Damping may be accomplished by mechanical or electronic means. One form of electronic damping which is commonly used is known as delayed-last-step damping. This method utilizes the highly oscillatory nature of the rotor response to its advantage by delaying the last pulse to the stepper motor until such time as the torque provided is minimum. Delayed-last-step damping is described in the proceedings of the Second Annual Symposium on Incremental Motion Control Systems and Devices, 1973, pages H1 through H-13, and the proceedings of the Seventh Annual Symposium on Incremental Motion Control Systems and Devices, 1978, pages 283 through 289.

Delayed-last-step damping requires that the timing of pulses to the stepper motor be adjusted each time the number of steps to be moved is changed.

SUMMARY OF THE PRESENT INVENTION

It is therefore an object of the present invention to provide circuitry capable of damping oscillatory response of the rotor of a stepper motor over a wide range of steps.

It is a further object of the present invention to provide circuitry for electronic damping of stepper motors having improved reliability.

Briefly, the present invention includes a clock and frequency synthesizer for generating a clock signal which is fed through a gate to a digitally controllable counter. After the appropriate number of clock cycles, the digitally controllable counter will generate an output that is fed to the gate to block the clock signal. For each clock cycle fed to the digitally controllable counter, a pulse is generated which is fed to the stepper motor driver circuit. Also included is a delay circuit which is responsive to the output of the digitally controllable counter and generates a pulse after an appropriate time delay. The delayed pulse is then fed to the stepper motor driver circuit.

An advantage of the circuit of the present invention is that adjustment of the pulse timing may be made over a wide range of steps.

A further advantage is that improved reliability of electronic damping for stepper motors is achieved.

These and other objects and advantages of the present invention will no doubt become obvious to those of ordinary skill in the art after having read the following detailed description of the preferred embodiment which is illustrated in the various drawing figures.

IN THE DRAWING

FIG. 1 is a block diagram of the electronic damping circuit in accordance with the present invention; and FIG. 2 is a chart illustrating the output pulses of the electronic damping circuit of FIG. 1.

DETAILED DESCRIPTION OF THE PREFERRED EMBODIMENT

FIG. 1 illustrates an electronic damping circuit for stepper motors in accordance with the present invention and referred to by the general reference numeral 10. The circuit 10 includes a crystal oscillator 12 for generating s sinusoidal clock signal. The output of the crystal oscillator 12 is fed to a frequency divider 14 which provides an output signal of square pulses having a frequency $f_{os}$ which is equal to the over-shoot or natural frequency of the rotor of the stepper motor driven by the circuit 10. The natural frequency of the rotor of a stepper motor can easily be determined by measuring the period of the overshoot oscillation. A position transducer connected to the rotor with its output displayed on an oscilloscope will, upon an operation of the undamped stepper motor, provide a display of the natural frequency. Such a measurement should be made with the rotor of the stepper motor connected to the entire mechanism that it is intended to drive, so as to provide the response characteristic of the rotor with its entire mechanical load. The output of the divider 14 is fed to a frequency synthesizer 16 which also receives a binary input signal 18. The binary input 18 comprises a plurality of lines for providing a digital representation of an integer N. The frequency synthesizer 16 generates a clock signal comprising square pulses having a frequency $Nf_{os}$. It is the operation of crystal oscillator 12, frequency divider 14 and frequency synthesizer 16 together which provide the output comprising square pulses having frequency $Nf_{os}$. The combination of crystal oscillator 12, frequency divider 14 and frequency synthesizer 16 thus form a frequency synthesizer means for generating a clock signal of predetermined control frequency. That predetermined control frequency is the product of the natural frequency of the rotor of the stepper motor to be operated, and an integer value applied to binary input 18. The output of the frequency synthesizer 16 is fed to a gate 20 which transmits the clock signal when the gate 20 is enabled. The clock signal is then fed to the clock input of a digitally controllable counter 22 which also receives the binary input 18. The digitally controllable counter 22 will generate a borrow signal coincident with the N plus first (N+1st) clock pulse received by the digitally controllable counter 22. The borrow signal from the digitally controllable counter 22 is fed to a one-shot device 24. The output of the one-shot device 24 will go high upon receipt of the borrow signal and will go low after a predetermined time delay. The output from the one-shot device 24 is fed to a pulse shaper 26. When the input to the pulse shaper 26 goes from high to low, the pulse shaper 26 will generate an output pulse which is then fed to an OR gate 28.

The clock output from the gate 20 is also fed to a pulse shaper 30. The pulse shaper 30 will generate pulses of short duration which are fed to the OR gate 28.

The borrow signal from the digitally controllable counter 22 is also fed to a pulse shaper 32. The pulse shaper 32 will generate an output pulse when its input goes from low to high. The output from the pulse shaper 32 is then fed to an inverter 34. The output of the inverter 34 is fed to a flip-flop 36. The flip-flop 36 also receives an input from a pulse shaper 38. The output of the pulse shaper 38 is also fed to the frequency synthesizer 16. The output of the flip-flop 36 is fed to the enable input of the gate 20.

The operation of the electronic damping circuit 10 is believed to be as follows. The binary input 18 is set to a value which is two less than the number of steps to be moved by the stepper motor. An execute step signal is provided to the pulse shaper 38 which generates an output pulse. The output pulse is fed to the flip-flop 36 which provides an enable signal to the gate 20.

The crystal 12 will generate a clock signal which is divided by the divider 14 to produce a signal having a frequency equal to the over-shoot frequency of the rotor of the stepper motor. This signal is then fed to the frequency synthesizer 16. The frequency synthesizer 16 includes a phase locked loop circuit (not shown) which provides a reliable output signal having a frequency of $Nf_{os}$. The signal from the pulse shaper 38 presets a counter in the frequency synthesizer 16 so that the first pulse is output immediately following the execute step signal. The output of the frequency synthesizer 16 is fed to the gate 20 which in the enable state will transmit the clock signal to its output. The clock signal from the gate 20 is then fed to the pulse shaper 30 which will generate output pulses of short duration. The output pulses from the pulse shaper 30 are then fed to the OR gate 28.

Referring now to FIG. 2, the output of the OR gate 28 corresponding to the pulses generated by the pulse shaper 30 are illustrated as the first N+1st pulses.

Coincident with the N+1st pulse the digitally controllable counter 22 will generate a borrow signal which is fed to the pulse shaper 32. The pulse shaper 32 will generate an output pulse which is inverted by the inverter 34 and fed to the reset input of the flip-flop 36. Upon receipt of the inverted pulse by the flip-flop 36 the output of the flip-flop 36 will then go low causing the gate 20 to block the clock signal. Thus, N+1 clock pulses are fed to the pulse shaper 30. Since the frequency of the clock signal is $Nf_{os}$ the period from the first pulse to the N+1st pulse will be equal to the period of one cycle of the rotor of the stepper motor oscillating at its natural frequency. Therefore, the stepper motor will be excited within a period of the resonant frequency. This excitation conditions the stepper motor in resonant mode with a predictable phase. That is at the end of the N+1st pulse which is provided at the end of the period of the resonance frequency, the rotor of the stepper motor will oscillate at its natural frequency. After one half period the rotor of the stepper motor will reach its maximum overshoot and will reverse direction. At this time the delayed last pulse is applied.

The borrow signal generated by the programable counter 22 is also fed to the one-shot device 24. The output of the one-shot 24 will go high upon receipt of the borrow signal. After a time delay equal to one-half the period of the over-shoot frequency $f_{os}$ the output of the one-shot device 24 will go low. This high to low transition will trigger the pulse shaper 26 causing it to generate an output pulse. The output pulse from the pulse shaper 26 is fed to the OR gate 28 and is illustrated in FIG. 2 as the delayed last pulse.

The sequence of pulses illustrated in FIG. 2 cause the rotor of a stepper motor to over-shoot the position defined by the N+1st pulse and after one-half the period of the frequency $f_{os}$ the angular velocity of the rotor of the stepper motor will be zero. Thus, when the delayed last pulse is generated the rotor of the stepper motor will be advanced to the final position with zero angular velocity and the last pulse will hold the rotor of the stepper motor in this position without any over-shoot.

The circuit 10 of the present invention is capable of adjusting the pulse timing for delayed-last-step damping over a wide range of steps. The circuit 10 will also provide a reliable pulse train since the frequency synthesizer 16 includes a phase lock loop.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A digitally controllable electronic damper for stepper motors, comprising:

digitally controllable frequency synthesizer means for generating a clock signal of a predetermined control frequency;

first gate means for receiving said clock signal and including an enable input and an output whereby said clock signal is transmitted on said output when a signal is received on said enable input;

digitally controllable counter means responsive to said clock signal on said output of the first gate means for generating a borrow signal after a digitally controllable number of pulses of said clock signal;

delay means responsive to said borrow signal for generating a delayed pulse after a predetermined time;

flip-flop means for generating an enable signal to be provided to said enable input of the first gate means and responsive to an execute signal to generate said enable signal and also responsive to said borrow signal to terminate said enable signal; and second gate means responsive to said clock signal transmitted by the first gate means and responsive to said delayed pulse for transmitting said clock signal and delayed pulse on an output.

2. The digitally controllable electronic damper of claim 1, wherein:
said digitally controllable frequency of said clock signal is a predetermined integer multiple of the natural frequency of the rotor of the stepper motor;
said predetermined time is one-half the period of said natural frequency of the stepper motor; and wherein
the digitally controllable counter includes a binary input and said borrow signal is generated coincident with the pulse of said clock signal which is one greater than said binary input.

3. The digitally controllable electronic damper of claim 2, wherein:
the frequency synthesizer means includes a crystal oscillator.

4. The digitally controllable electronic damper of claim 1, wherein;
the delay means comprises a one-shot device responsive to said borrow signal for providing an output which remains high for said predetermined time and a pulse shaper responsive to the high to low transition of said output of said one-shot device for generating said delayed pulse.

5. A method for generating a variable number of electrical pulses for steering a stepper motor wherein the last pulse is delayed by a predetermined amount of time comprising the steps of:
generating a clock signal;
providing an enable signal whereby the clock signal is transmitted;
outputting said transmittal clock signal;
counting pulses of said transmitted clock signal;
generating a borrow signal coincident with the clock pulse which is one less than the total number of pulses to be provided;
blocking the clock signal simultaneously with generating said borrow signal;
waiting a predetermined time after generating said borrow signal; and
generating a pulse after said predetermined time.

6. The digital controllable electronic damper of claim 2, wherein;
said integer multiple is a number equal to one less than said number of pulses of said clock signal after which said borrow signal is generated.

* * * * *